(12) United States Patent
Lapstun

(10) Patent No.: US 7,264,173 B2
(45) Date of Patent: Sep. 4, 2007

(54) ORIENTATION-INDICATING CYCLIC POSITION CODES

(75) Inventor: Paul Lapstun, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 72 days.

(21) Appl. No.: 10/531,734

(22) PCT Filed: Oct. 10, 2003

(86) PCT No.: PCT/AU03/01343

§ 371 (c)(1),
(2), (4) Date: Apr. 18, 2005

(87) PCT Pub. No.: WO2004/038650

PCT Pub. Date: May 6, 2004

(65) Prior Publication Data

US 2006/0118643 A1 Jun. 8, 2006

Related U.S. Application Data

(63) Continuation of application No. 10/409,864, filed on Apr. 9, 2003, now abandoned.

(30) Foreign Application Priority Data

Oct. 25, 2002 (AU) .............................. 2002952259

(51) Int. Cl.
*G06K 19/06* (2006.01)

(52) U.S. Cl. ............. 235/494; 235/462.04; 235/462.38
(58) Field of Classification Search ................ 235/494, 235/462.04, 462.38
See application file for complete search history.

(56) References Cited

U.S. PATENT DOCUMENTS

| | | | |
|---|---|---|---|
| 4,745,269 A | 5/1988 | Van Vils | |
| 5,449,896 A | 9/1995 | Hecht et al. | |
| 5,572,010 A | 11/1996 | Petrie | |
| 5,612,524 A | 3/1997 | Sant Anselmo et al. | |
| 5,635,697 A | 6/1997 | Shellhammer et al. | |
| 6,141,441 A | 10/2000 | Cass et al. | |
| 6,674,427 B1 | 1/2004 | Pettersson et al. | |

FOREIGN PATENT DOCUMENTS

EP         0844586 A         3/1998

*Primary Examiner*—Kimberly D. Nguyen

(57) ABSTRACT

Machine-readable coded data disposed on or in a substrate in accordance with a layout, the layout having at least order n rotational symmetry, where n is at least two, the layout encoding an orientation codeword comprising a sequence of an integer multiple m of of n symbols, where m is one or more, each encoded symbol being distributed at n locations about a center of rotational symmetry of the layout such that decoding the symbols at each of the n orientations of the layout produces n representations of the orientation codeword, each representation comprising a different cyclic shift of the orientation codeword and being indicative of the degree of rotation of the layout, and wherein the orientation codeword is fault tolerant.

35 Claims, 14 Drawing Sheets

ORIENTATION-INDICATING CYCLIC POSITION CODES

CROSS REFERENCES TO RELATED APPLICATIONS

The present application is a 371 of PCT/AU03/01343 filed on Oct. 10, 2003, which is a continuation application of U.S. application Ser. No. 10/409,864.

FIELD OF INVENTION

This invention relates to orientation-indicating cyclic position codes and their use in the position-coding of surfaces.

CO-PENDING APPLICATIONS

Various methods, systems and apparatus relating to the present invention are disclosed in the following U.S. applications co-filed by the applicant or assignee of the present invention:

U.S. Ser. No. 10/410,484 entitled "Symmetric Tags";
U.S. Ser. No. 10/409,876 entitled "Methods and Systems for Object Identification and Interaction";
U.S. Ser. No. 10/409,848 entitled "Methods and Systems for Object Identification and Interaction"; and
U.S. Ser. No. 10/409,845 entitled "Methods and Systems for Object Identification and Interaction".

The disclosures of these co-filed applications are incorporated herein by cross-reference.

Various methods, systems and apparatus relating to the present invention are disclosed in the following application filed by the applicant or assignee of the present invention on 7 Apr. 2003: Australian Provisional Application No 2003901617 entitled "Methods and Systems for Object Identification and Interaction". The disclosures of this co-pending application are incorporated herein by cross-reference.

Various methods, systems and apparatus relating to the present invention are disclosed in the following co-pending PCT applications filed by the applicant or assignee of the present invention on 4 Dec. 2002: U.S. Ser. No. 10/309,358 entitled "Rotationally Symmetric Tags". The disclosures of these co-pending applications are incorporated herein by cross-reference.

Various methods, systems and apparatus relating to the present invention are disclosed in the following co-pending PCT applications filed by the applicant or assignee of the present invention on 22 Nov. 2002:

PCT/AU02/01572 and PCT/AU/02/01573.

The disclosures of these co-pending applications are incorporated herein by cross-reference.

Various methods, systems and apparatus relating to the present invention are disclosed in the following co-pending PCT applications filed by the applicant or assignee of the present invention on 15 Oct. 2002:

PCT/AU02/01391, PCT/AU02/01392, PCT/AU02/01393, PCT/AU02/01394 and PCT/AU02/01395.

The disclosures of these co-pending applications are incorporated herein by cross-reference.

Various methods, systems and apparatus relating to the present invention are disclosed in the following co-pending PCT applications filed by the applicant or assignee of the present invention on 26 Nov. 2001:

PCT/AU01/01527, PCT/AU01/01528, PCT/AU01/01529, PCT/AU01/01530 and PCT/AU01/01531.

The disclosures of these co-pending applications are incorporated herein by cross-reference.

Various methods, systems and apparatus relating to the present invention are disclosed in the following co-pending PCT application filed by the applicant or assignee of the present invention on 11 Oct. 2001: PCT/AU01/01274. The disclosures of this co-pending application are incorporated herein by cross-reference.

Various methods, systems and apparatus relating to the present invention are disclosed in the following co-pending PCT application filed by the applicant or assignee of the present invention on 14 Aug. 2001: PCT/AU01/00996. The disclosures of this co-pending application are incorporated herein by cross-reference.

Various methods, systems and apparatus relating to the present invention are disclosed in the following co-pending U.S. applications filed by the applicant or assignee of the present invention on 27 Nov. 2000: U.S Pat. Nos. 6,530,339 6,631,897 Ser. Nos. 09/721,895 09/722,174 09/721,896 U.S. Pat. Nos. 7,064,851 6,826,547 6,741,871 6,927,871 6,980,306 6,965,439 6,788,982 Ser. No. 09/722,141 U.S. Pat. Nos. 6,788,293 6,946,672 7,091,960 6,792,165 7,105,753 Ser. No. 09/721,862

The disclosures of these co-pending applications are incorporated herein by cross-reference.

Various methods, systems and apparatus relating to the present invention are disclosed in the following co-pending U.S. applications filed by the applicant or assignee of the present invention on 20 Oct. 2000: Ser. No. 09/693,415 U.S. Pat. Nos. 7,110,126 6,813,558 6,965,454 6,847,883 7,131,058 Ser. No. 09/693,690 U.S. Pat. Nos. 6,982,798 6,474,888 6,627,870 6,724,374 Ser. No. 09/693,514 U.S. Pat Nos. 6,454,482 6,808,330 6,527,365 6,474,773 6,550,997

The disclosures of these co-pending U.S. applications are incorporated herein by cross-reference.

Various methods, systems and apparatus relating to the present invention are disclosed in the following co-pending U.S. applications filed by the applicant or assignee of the present invention on 15 Sep. 2000: U.S. Pat. Nos. 6,679,420 6,963,845 6,995,859 6,720,985

The disclosures of these co-pending applications are incorporated herein by cross-reference.

Various methods, systems and apparatus relating to the present invention are disclosed in the following co-pending U.S. applications filed by the applicant or assignee of the present invention on 30 Jun. 2000: U.S. Pat. Nos. 6,824,044 6,678,499 6,976,220 6,976,035 6,766,942 Ser. No. 09/609,303 U.S. Pat. Nos. 6,922,779 6,978,019 Ser. No. 09/607,843 U.S. Pat. Nos. 6,959,298 6,973,450 Ser. No. 09/609,553 U.S. Pat. No. 6,965,882 Ser. No. 09/608,022 U.S. Pat. Nos. 7,007,851 6,957,921 6,457,883 6,831,682 6,977,751 6,398,332 6,394,573 6,622,923

The disclosures of these co-pending applications are incorporated herein by cross-reference.

Various methods, systems and apparatus relating to the present invention are disclosed in the following co-pending U.S. applications filed by the applicant or assignee of the present invention on 23 May 2000: U.S. Pat. Nos. 6,428,133 6,526,658 6,315,399 6,338,548 6,540,319 6,328,431 6,328,425 6,991,320 6,383,833 6,464,332 6,390,591 7,018,016 6,328,417 Ser. No. 09/575,197 U.S. Pat. No. 7,079,712 Ser. No. 09/575,123 U.S. Pat. No. 6,825,945 Ser. No. 09/575,165 U.S. Pat. Nos. 6,813,039 6,987,506 7,038,797 6,980,318 6,816,274 7,102,772 Ser. No. 09/575,186 U.S. Pat. Nos. 6,681,045 6,728,000 Ser. No. 09/575,145 U.S. Pat. No.

7,088,459 Ser. No. 09/575,181 U.S. Pat. Nos. 7,068,382 7,062,651 6,789,194 6,789,191 6,644,642 6,502,614 6,622,999 6,669,385 6,549,935 6,987,573 6,727,996 6,591,884 6,439,706 6,760,119 Ser. No. 09/575,198 U.S. Pat. Nos. 6,290,349 6,428,155 6,785,016 6,870,966 6,822,639 6,737,591 7,055,739 Ser. No. 09/575,129 U.S. Pat. Nos. 6,830,196 6,832,717 6,957,768 Ser. Nos. 09/575,162 09/575,172 09/575,170 U.S. Pat. Nos. 7,106,888 7,123,239 6,409,323 6,281,912 6,604,810 6,318,920 6,488,422 6,795,215 Ser. No. 09/575,109 U.S. Pat. No. 6,859,289

The disclosures of these co-pending applications are incorporated herein by cross-reference.

BACKGROUND

It is known to provide one or more coded data structures on a surface that can be read and decoded by a suitable sensing device. Various embodiments of such a device incorporating an optical sensor are described in many of the documents incorporated into the present application by cross-reference.

The coded data structures disclosed in these documents include target features that enable the sensing device to identify the position of each structure. The relative positions of the features within each structure can also be interpreted to determine perspective distortion of the structure as sensed, enabling perspective correction to be performed on the sensed data. However, to enable the sensing device to decode the data in the structure, it is necessary that the rotational orientation of the structure be determined. Typically, this is achieved by providing at least one feature that is rotationally asymmetric in some way. For example, in one embodiment, a keyhole-shaped feature is provided that can be located with respect to the other features, and then recognised to ascertain the rotational orientation of the structure in relation to the sensing device. The actual data that is encoded in the data structure can then be decoded, since its position in the data structure can be inferred from the structure's position and rotational orientation.

Disadvantages with this arrangement include the need to dedicate space to one or more orientation features, and the difficulty of including redundancy in such features for the purposes of allowing rotational orientation determination in the presence of damage to the features. It is desirable, therefore, to encode orientation information both more space-efficiently and in an error-detectable and/or error-correctable fashion.

SUMMARY OF THE INVENTION

According to a first aspect of the present invention there is disclosed machine-readable coded data disposed on or in a substrate in accordance with a layout, the layout having at least order n rotational symmetry, where n is at least two, the layout encoding an orientation codeword comprising a sequence of an integer multiple m of n symbols, where m is one or more, each encoded symbol being distributed at n locations about a center of rotational symmetry of the layout such that decoding the symbols at each of the n orientations of the layout produces n representations of the orientation codeword, each representation comprising a different cyclic shift of the orientation codeword and being indicative of the degree of rotation of the layout, and wherein the orientation codeword is fault tolerant.

Preferably, the orientation codeword is sufficiently fault tolerant such that each representation of the orientation codeword can be accurately decoded even if one of its symbols is corrupted.

Preferably, the orientation codeword is sufficiently fault tolerant such that each representation of the orientation codeword can be accurately decoded even if two or more of its symbols are corrupted.

Preferably, the layout is repeated on the substrate within a layout region.

Preferably, the layout region comprises a plurality of layouts of two or more layout types, each layout encoding its layout type.

Preferably, the machine-readable coded data encodes a distributed codeword wherein fragments of the distributed codeword are distributed between the two or more layout types in a predetermined manner such that the distributed codeword can be reconstructed from fragments located in a plurality of adjacent layouts of different types. More preferably, the number of layout types is one of 2, 3, 4 and 6.

Preferably, the layout encodes a local codeword wherein fragments of the local codeword are distributed within the layout in a predetermined manner such that the local codeword can be reconstructed from the fragments.

In one form, the layouts are packed together on the substrate.

Preferably, the layout is any of the following in shape:
linear;
square;
rectangular;
triangular; or
hexagonal.

Preferably, n is one of 2, 3, 4 and 6.

Preferably, the machine-readable coded data includes one or more target features for enabling preliminary location and rotation of the layout to be determined by a machine used to read the coded data.

Preferably, the target features are configured to enable perspective correction of the coded data of the, or each, layout upon reading by the machine. More preferably, the machine-readable coded data includes at least four of the target features.

Preferably, the machine-readable coded data includes a plurality of the layouts, wherein at least some of the target features are shared by at least two of the layouts.

Preferably, the coded data is printed onto the substrate.

Preferably, the coded data is printed onto the surface in ink that is of low-visibility or is invisible to an average unaided human eye. More preferably, the ink is an infrared ink that is substantially invisible to an average unaided human eye.

Preferably, the coded data of each layout defines user data.

Preferably, the user data includes location data indicative of a position of the layout pattern relative to a region of the surface.

Preferably, the user data includes identification data identifying a region of the surface within which the layout is disposed.

Preferably, the user data includes function data identifying a function to be performed upon reading of the layout pattern or sub-pattern by the machine.

According to a second aspect of the present invention there is disclosed a surface bearing machine-readable coded data as disclosed in the preceding paragraphs.

Preferably, the surface is flat or curved.

Preferably, the surface further includes visible markings. More preferably, the visible markings include any one or more of the following:
text;
graphics;
images;

forms;
fields; and
buttons.

Preferably, the visible marking are disposed adjacent to, or coincident with, at least some of the coded data.

Preferably, the surface is defined by a substrate. More preferably, the substrate is paper, card or another laminar medium.

Preferably, the surface is configured for use as an interface surface for enabling user interaction with a computer.

According to a third aspect of the present invention there is disclosed a method of generating an interface surface, including the steps of:

receiving, in a printer, user data;

generating machine-readable coded data incorporating the user data, as disclosed in the preceding paragraphs; and printing the coded data onto a substrate.

Preferably, the method further includes the step of printing visible markings on the substrate.

Preferably, the coded data and visible markings are printed onto the substrate substantially simultaneously.

According to a fourth aspect of the present invention there is disclosed a method of using a sensing device to read machine-readable coded data as disclosed in the preceding paragraphs, the method including the steps of:

(a) reading, using the sensing device, the coded data of the layout;

(b) decoding the coded data of the layout, thereby determining at least the representation of the orientation codeword; and (c) using the representation of the orientation codeword to determine a degree of rotation of the layout.

Preferably, step (a) includes the substeps of:

imaging the substrate to generate an image thereof;

processing the image to locate one or more target features of the coded data; and on the basis of the located target features, determining a position of at least one of the encoded symbols of the orientation codeword.

BRIEF DESCRIPTION OF THE DRAWINGS

Preferred and other embodiments of the invention will now be described, by way of non-limiting example only, with reference to the accompanying drawings, in which.

DESCRIPTION OF PREFERRED AND OTHER EMBODIMENTS

This document defines the surface coding used by the netpage system (as disclosed in the present applicants' co-pending PCT application publication number WO 01/22207—Method and System for Instruction of a Computer, the contents of which are herein incorporated by reference) to imbue otherwise passive surfaces with interactivity in conjunction with netpage sensing devices such as the netpage pen (as disclosed in the present applicants' co-pending PCT application publication number WO 00/72230—Sensing Device, the contents of which are herein incorporated by reference) and the netpage viewer (as disclosed in the present applicants' co-pending PCT application publication number WO 01/41046—Viewer with Code Sensor, the contents of which are herein incorporated by reference).

When interacting with a netpage coded surface, a netpage sensing device generates a digital ink stream which indicates both the identity of the surface region relative to which the sensing device is moving, and the absolute path of the sensing device within the region.

1. Surface Coding

The netpage surface coding consists of a dense planar tiling of tags. Each tag encodes its own location in the plane. Each tag also encodes, in conjunction with adjacent tags, an identifier of the region containing the tag. In the netpage system, the region typically corresponds to the entire extent of the tagged surface, such as one side of a sheet of paper.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

1.1 Tag Structure

Figure 1:
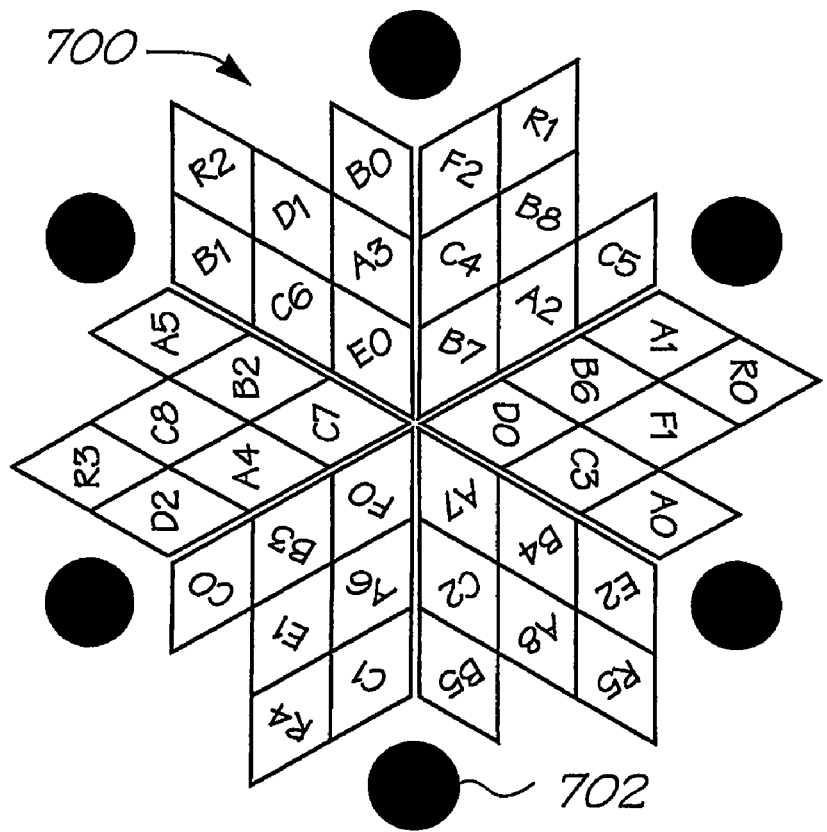
FIG. 1 shows a first embodiment of a tag structure according to the invention.

FIG. 1 shows the structure of a complete tag 700. Each of the six black circles 702 is a target. The tag, and the overall pattern, is six-fold symmetric at the physical level.

Each diamond-shaped region 704 represents a symbol, and each symbol represents four bits of information.

Figure 2:
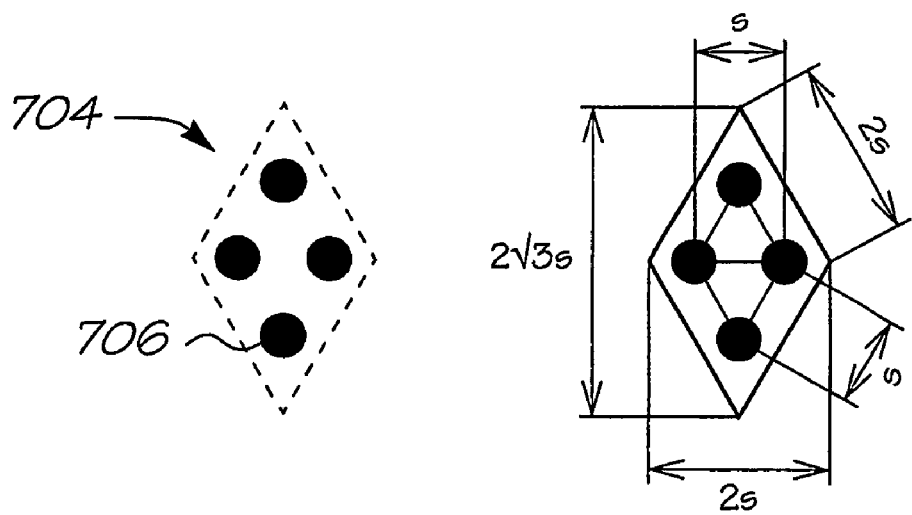
FIG. 2 shows a symbol unit cell of the tag structure of FIG. 1.

FIG. 2 shows the structure of a symbol. It contains four macrodots 706, each of which represents the value of one bit by its presence (one) or absence (zero).

The macrodot spacing is specified by the parameter s throughout this document. It has a nominal value of 143 μm, based on 9 dots printed at a pitch of 1600 dots per inch. However, it may vary within defined bounds according to the capabilities of the device used to produce the pattern.

In general, if a surface is coded with a pattern which deviates from the "ideal" pattern specified in this document, e.g. due to device limitations, then the deviation must be recorded so that any digital ink captured via the surface can be appropriately corrected for the deviation.

Figure 3:
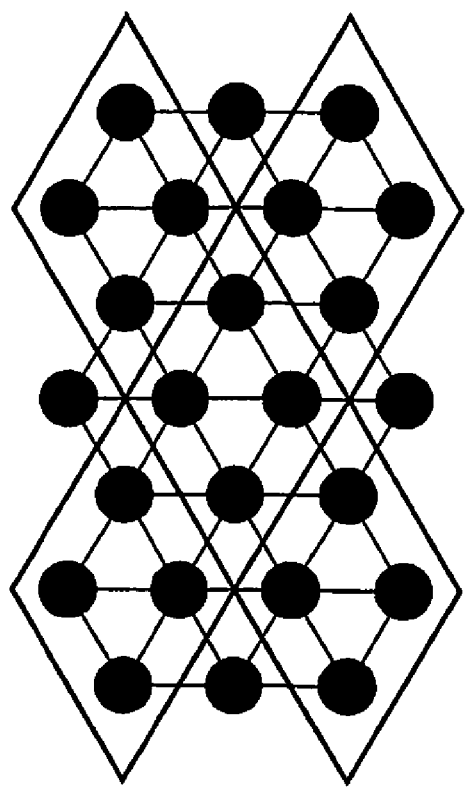
FIG. 3 shows an array of symbol unit cells.

FIG. 3 shows an array of five adjacent symbols. The macrodot spacing is uniform both within and between symbols.

Figure 4:
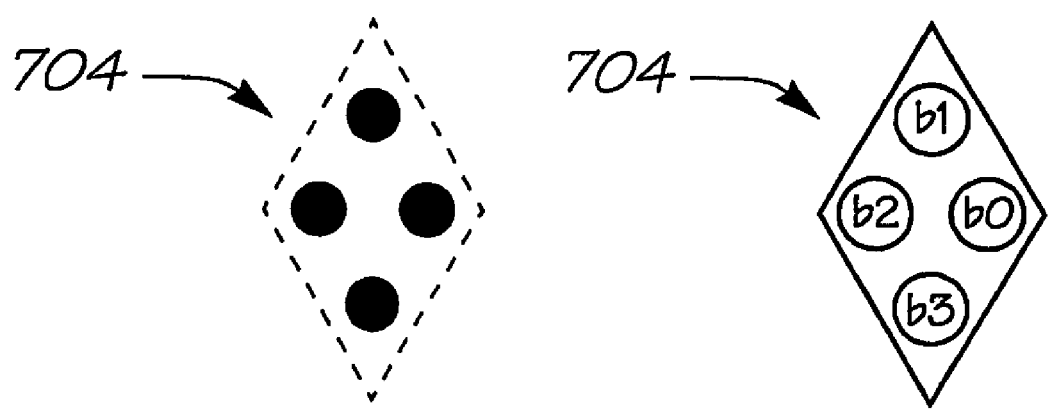
FIG. 4 is a schematic illustrating symbol bit ordering.

FIG. 4 shows the ordering of the bits within a symbol. Bit zero is the least significant within a symbol; bit three is the most significant. Note that this ordering is relative to the orientation of the symbol. The orientation of a particular symbol within the tag is indicated by the orientation of the label of the symbol in the tag diagrams (see FIG. 1, for example). In general, the orientation of all symbols within a particular segment of the tag have the same orientation, consistent with the bottom of the symbol being closest to the centre of the tag.

Figure 5:
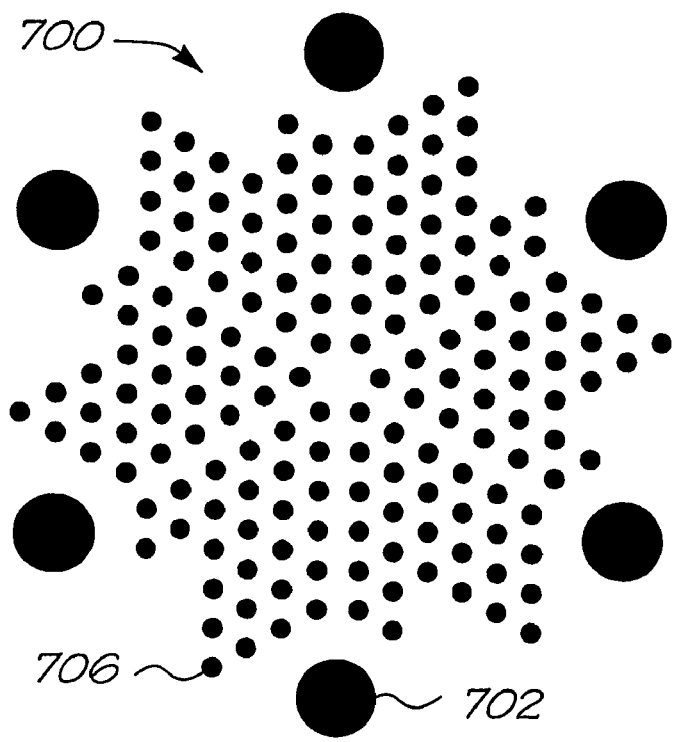
FIG. 5 shows the pattern of a tag with every bit set.

In the preferred embodiment only the macrodots are part of the representation of a symbol in the pattern. The diamond-shaped outline of a symbol is used in this document to more clearly elucidate the structure of a tag. FIG. 5, by way of illustration, shows the actual pattern of a tag with every bit set. Note that, in the preferred embodiment, every bit of a tag can never be set in practice.

A macrodot is nominally circular with a nominal diameter of (5/9)s. However, it may vary within defined bounds according to the capabilities of the device used to produce the pattern.

A target is nominally circular with a nominal diameter of (17/9)s. However, it may vary within defined bounds according to the capabilities of the device used to produce the pattern.

Each symbol shown in the tag structure in FIG. 1 has a unique label. Each label consists of an alphabetic prefix and a numeric suffix.

1.2 Error Detection and Correction

Assume the data to be coded is broken into k-symbol blocks, with the q-ary symbols taken from the Galois field GF(q). The collection of all possible k-tuples $m=(m_0, m_1, \ldots, m_{k-1})$ forms a vector space over GF(q), containing $q^k$ possible vectors. A corresponding block error code C of length n consists of a set of M n-symbol codewords $\{c_0, c_1, \ldots, c_{M-1}\}$, where $M=q^k$ and n>k, with each codeword of the form $c=(c_0, c_1, \ldots, c_{n-1})$. Given a data block to be encoded, the encoder maps the data block onto a codeword in C. Since the collection of all possible n-tuples over GF(q) contains $q^n$ vectors, but there are only $M=q^k$ codewords, the code contains redundancy. This is expressed logarithmically by $r=n-\log_q M=n-k$, or by the code rate $R=k/n$. The code C is a linear code if it forms a vector subspace over GF(q), i.e. if it is closed under addition and under multiplication by a scalar (and thus contains the zero vector). The code is then said to have dimension k and is referred to as an (n, k) code.

The Hamming distance between two codewords is the number of symbols in which the two codewords differ. The minimum distance $d_{min}$ of a block code is the smallest Hamming distance of any pair of distinct codewords in the code. The maximum distance $d_{max}$ is the largest Hamming distance of any pair of distinct codewords in the code.

An error pattern introduces symbol errors into a codeword. It is characterized by its weight, i.e. the number of symbols it corrupts. For an error pattern to be undetectable, it must cause a codeword to look like another codeword. A code with a minimum distance of $d_{min}$ can thus detect all error patterns of weight less than or equal to $d_{min}-1$. Although a given code can detect many error patterns with greater weights, this provides a limit on the weight for which a code can detect all error patterns.

Given a sampled word possibly corrupted by an error pattern, the decoder maps the sampled word onto a codeword in. C in such a way as to minimize the probability that the codeword is different from the codeword originally written, and then maps the codeword onto a data block. In the absence of a more specific characterization, it is assumed that lower-weight error patterns are more likely than higher-weight error patterns, and that all error patterns of equal weight are equally likely. The maximum likelihood written codeword is thus the codeword which is closest in Hamming distance to the sampled word. If the sampled word is closer to an incorrect codeword than the correct (written) codeword, then the decoder commits an error. Since codewords are by definition at least a distance $d_{min}$ apart, decoder errors are only possible if the weight of the error pattern is greater than or equal to $d_{min}/2$. A maximum likelihood decoder can thus correct all error patterns of weight less than or equal to $\lfloor(d_{min}-1)/2\rfloor$. Equivalently, the decoder can correct t errors so long as $2t<d_{min}$.

The minimum distance of a linear code is limited by the Singleton bound: $d_{min} \leq n-k+1$. Codes which satisfy the Singleton bound with equality are called maximum-distance separable (MDS). Reed-Solomon codes (see Wicker, S. B. and V. K. Bhargava, eds., *Reed-Solomon Codes and Their Applications*, IEEE Press, 1994, the contents of which are herein incorporated by reference) are the most commonly-used MDS codes. No binary codes are MDS.

An erasure is a symbol of a sampled word assumed to have been corrupted. Since its position in the codeword is known, it can be ignored for the purposes of decoding rather than being treated as an error. For example, the distance between the erased symbol in the sampled word and the corresponding symbol in a codeword is not included in the Hamming distance used as the basis for maximum likelihood decoding. Each erasure thus effectively reduces the minimum distance by one, i.e., in the presence of f erasures, up to $\lfloor(d_{min}-f-1)/2\rfloor$ errors can be corrected. Equivalently, the decoder can correct t errors and f erasures so long as $2t+f<d_{min}$. For an MDS code this becomes $2t+f \leq n-k+1$.

A code is systematic if each of its codewords contains, without modification, its corresponding data block at a fixed location. It is then possible to distinguish between the data (or message) coordinates of the code and the redundancy (or parity) coordinates of the code.

The rate of a linear code can be increased by puncturing the code, i.e. by deleting one or more of its redundancy coordinates. By the deletion of g coordinates, an (n, k) code is transformed into an (n−g, k) code. The minimum distance of the punctured code is $d_{min}-g$. Clearly, if $d_{min}-g<2$, puncturing destroys the code's ability to correct even one error, while if $d_{min}-g<1$, it destroys the code's ability to detect even one error. Equivalently, the length $w=n-g$ of the punctured code must obey $w \geq n-d_{min}+1$ to be error-detecting, and $w \geq n-d_{min}+2$ to be error-correcting. The decoder for a punctured code can simply treat deleted coordinates as erasures with respect to the original code.

A block code C is a cyclic code if for every codeword $c=(c_0, c_1, \ldots, c_{n-2}, c_{n-1}) \in C$, there is also a codeword $c'=(c_{n-1}, c_0, c_1, \ldots, c_{n-2}) \in C$, i.e. c' is a right cyclic shift It follows that all n cyclic shifts of c are also codewords in C. If the number of codewords $q^k$ exceeds the length of the code n, then the code contains a number of distinct cycles, with each cycle i containing $s_i$ unique codewords, where $s_i$ divides n. If the code contains the zero vector, then the zero vector forms its own cycle.

1.3 Orientation-Indicating Cyclic Position Code

The tag contains a $2^4$-ary (6, 1) cyclic position codeword (as disclosed in the present Applicants' co-pending PCT application publication number WO 02/084473—Cyclic Position Codes, the contents of which are herein incorporated by reference) which can be decoded at any of the six possible orientations of the tag to determine the actual orientation of the tag. Symbols which are part of the cyclic position codeword have a prefix of "R" and are numbered 0 to 5 in order of increasing significance.

The cyclic position codeword is $(0, 5, 6, 9, A_{16}, F_{16})$. Note that it only uses six distinct symbol values, even though a four-bit symbol has sixteen possible values. Any unused symbol value detected during decoding is treated as an erasure. Note that the actual symbol ordering within the codeword is not critical, nor is the composition of the subset of symbol values actually used. However, it is advantageous to chose a subset which maximises the minimum inter-symbol distance, since this helps ensure that a bit error is more likely to cause an erasure than a symbol error. This is advantageous because the erasure-correcting capacity of the code is roughly twice its error-correcting capacity (as discussed below).

Figure 6:
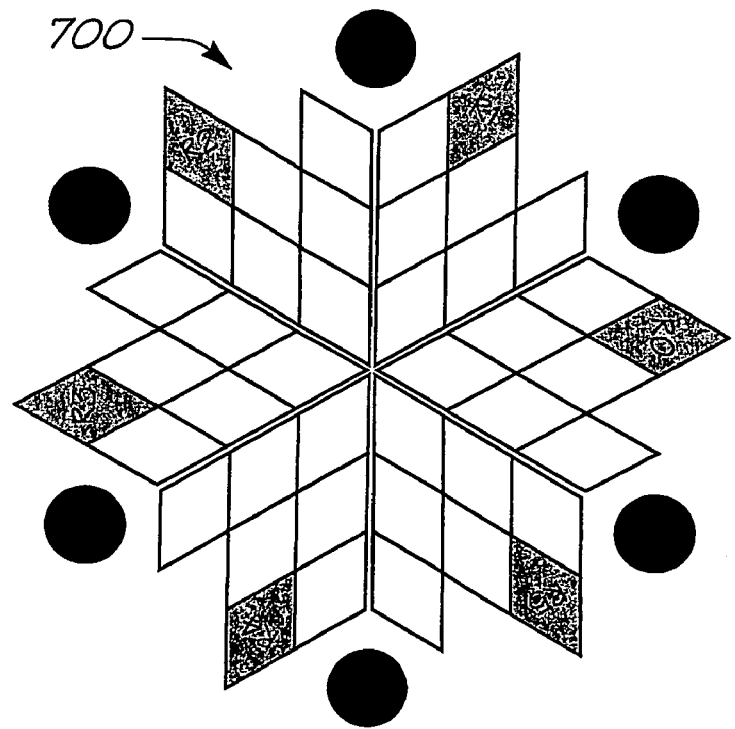
FIG. 6 shows the layout of an orientation-indicating cyclic position codeword.

The layout of the orientation-indicating cyclic position codeword is shown in FIG. 6 in which the codeword is shown shaded.

The minimum distance of the cyclic position code is 6, hence its error-correcting capacity is two symbols in the presence of up to one erasure, one symbol in the presence of two or three erasures, and no symbols in the presence of four or more erasures.

Table 1 shows the Hamming distance between the first codeword of the cyclic position code and each of the codewords of the code, computed with a single symbol error successively in each of the six possible locations in the codeword. In each case the corrupted symbol is indicated by ♦. For worst-case purposes the symbol is assumed to have been corrupted to the corresponding symbol of each of the other codewords. Whereas the distance between the corrupted codeword and its uncorrupted original is one in each case, the distance between the corrupted codeword and each of the other codewords is five in each case. Since every codeword is some cyclic shift of the first codeword, the table demonstrates the ability of the code to correct any single symbol error in any codeword.

By extension, it can be seen that in the presence of any two symbol errors the distance between the corrupted codeword and its uncorrupted original increases to two in each case, and the distance between the corrupted codeword and each of the other codewords decreases to four in each case.

The table therefore also demonstrates the ability of the code to correct any double symbol errors in any codeword. This is illustrated in Table 2.

TABLE 1

Cyclic position code distances in the presence of one error

| | codeword | | | | | |
|---|---|---|---|---|---|---|
| | 0569AF | 569AF0 | 69AF05 | 9AF056 | AF0569 | F0569A |
| 0569A♦ | 1 | 5 | 5 | 5 | 5 | 5 |
| 0569♦F | 1 | 5 | 5 | 5 | 5 | 5 |
| 056♦AF | 1 | 5 | 5 | 5 | 5 | 5 |
| 05♦9AF | 1 | 5 | 5 | 5 | 5 | 5 |
| 0♦69AF | 1 | 5 | 5 | 5 | 5 | 5 |
| ♦569AF | 1 | 5 | 5 | 5 | 5 | 5 |

TABLE 2

Cyclic position code distances in the presence of two errors

| | codeword | | | | | |
|---|---|---|---|---|---|---|
| | 0569AF | 569AF0 | 69AF05 | 9AF056 | AF0569 | F0569A |
| 0569♦♦ | 2 | 4 | 4 | 4 | 4 | 4 |
| 056♦♦F | 2 | 4 | 4 | 4 | 4 | 4 |
| 05♦♦AF | 2 | 4 | 4 | 4 | 4 | 4 |
| 0♦♦9AF | 2 | 4 | 4 | 4 | 4 | 4 |
| ♦♦69AF | 2 | 4 | 4 | 4 | 4 | 4 |
| ♦569A♦ | 2 | 4 | 4 | 4 | 4 | 4 |

The same distance calculations can be performed in the presence of one or more erasures by simply ignoring the erased coordinate(s). This is illustrated in Table 3, where a single erasure is indicated by -.

TABLE 3

Cyclic position code distances in the presence of one error and one erasure

| | codeword | | | | | |
|---|---|---|---|---|---|---|
| | -569AF | -69AF0 | -9AF05 | -AF056 | -F0569 | -0569A |
| -569A♦ | 1 | 4 | 4 | 4 | 4 | 4 |
| -569♦F | 1 | 4 | 4 | 4 | 4 | 4 |
| -56♦AF | 1 | 4 | 4 | 4 | 4 | 4 |
| -5♦9AF | 1 | 4 | 4 | 4 | 4 | 4 |
| -♦69AF | 1 | 4 | 4 | 4 | 4 | 4 |
| -569AF | 0 | 5 | 5 | 5 | 5 | 5 |

Decoding a sampled cyclic position codeword consists of detecting any erasures and then calculating the distance between the remaining (un-erased) symbols and the corresponding symbols in the six cyclic shifts of the original cyclic position codeword. The sampled codeword is then decoded as the shifted codeword which is closest in distance from the sampled codeword. Decoding fails if more than one shifted codeword is equally closest to the sampled codeword. Once the sampled codeword is decoded to a shifted codeword, the shift of that codeword is known and thus the rotation of the tag with respect to the sampling orientation known.

In addition to the six symbols which form the cyclic position codeword, at least an additional six symbols of adjacent tags' cyclic position codewords are also visible within the field of view. At the added expense of decoding these extra symbols, twelve symbols may be used to decode the cyclic position codeword. This may be done in two ways. In the first approach every erased symbol is simply replaced by its corresponding symbol from one of the other tags' cyclic position codewords, if the corresponding symbol has not itself been erased. In the second approach, all twelve symbols are treated as a twelve-symbol codeword.

The cyclic position code can also be used to detect whether the tag has been acquired mirror reflected, e.g. when the tag is imaged through the back of a transparent substrate on which it is disposed.

1.4 Local Codewords

The tag locally contains three complete codewords which are used to encode information unique to the tag. Each codeword is of a punctured $2^4$-ary (9, 5) Reed-Solomon code. The tag therefore encodes up to 60 bits of information unique to the tag.

Figure 7:
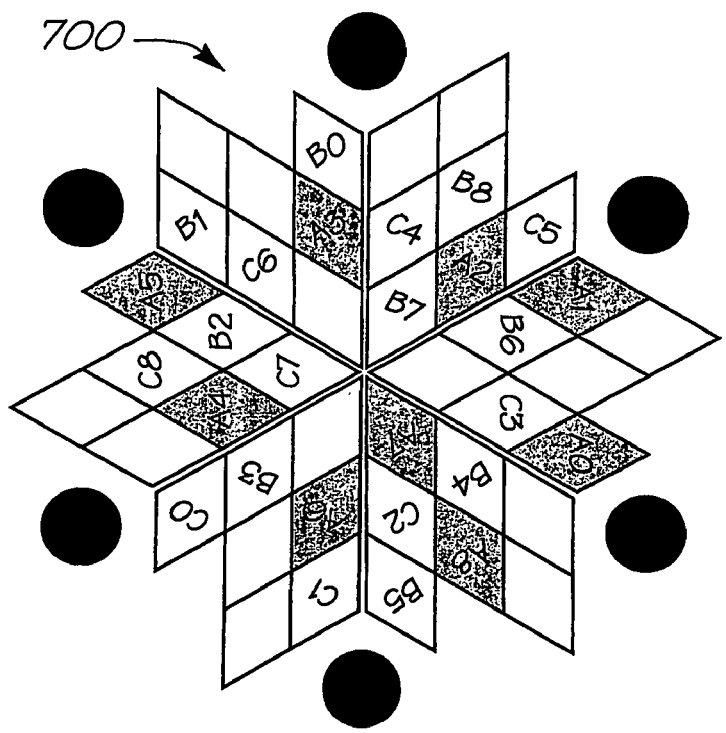
FIG. 7 shows the layout of three local codewords.

The layout of the three local codewords is shown in FIG. 7 in which codeword A is shown shaded.

1.5 Distributed Codewords

The tag also contains fragments of three codewords which are distributed across three adjacent tags and which are used to encode information common to a set of contiguous tags. Each codeword is of a punctured $2^4$-ary (9, 5) Reed-Solomon code. Any three adjacent tags therefore together encode up to 60 bits of information common to a set of contiguous tags.

Figure 8:
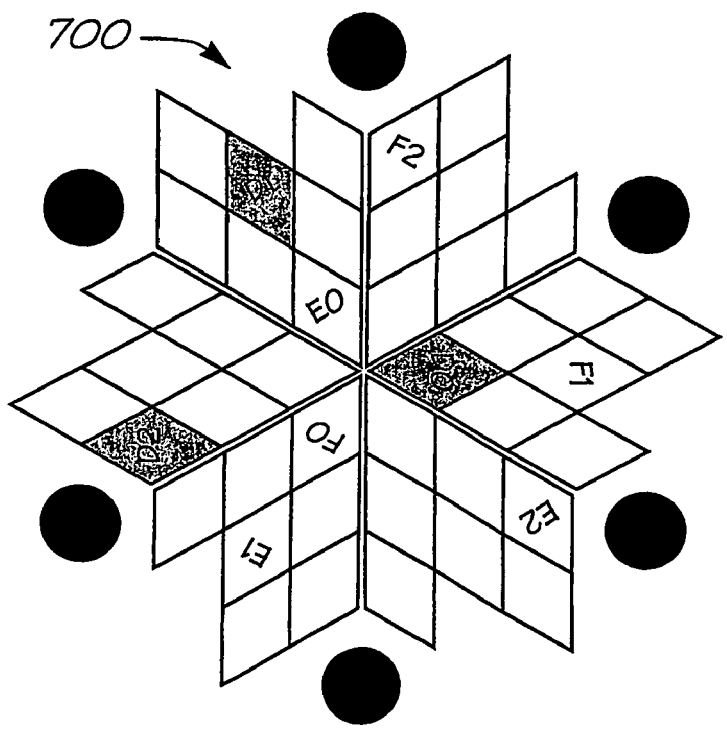
FIG. 8 shows interleaved fragments of distributed codewords D, E and F with a fragment of codeword D shown shaded.

The layout of the three codeword fragments is shown in FIG. 8.

Figure 9:
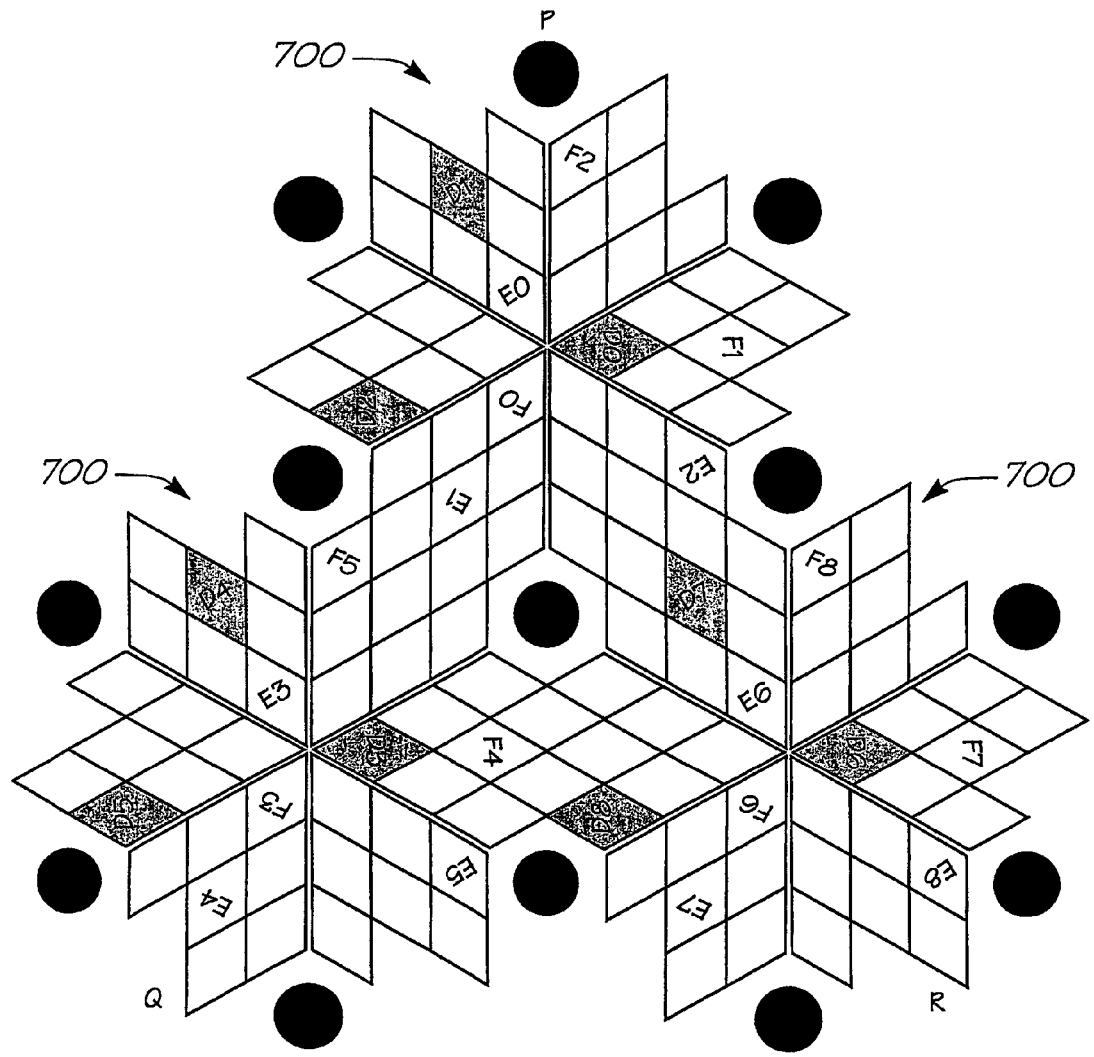
FIG. 9 shows three adjacent tags P, Q and R containing a complete set of distributed codewords D, E and F with codeword D shown shaded.

The layout of the three complete codewords, distributed across three adjacent tags, is shown in FIG. 9. In relation to these distributed codewords there are three types of tag. These are referred to as P, Q and R in order of increasing significance.

Figure 10:
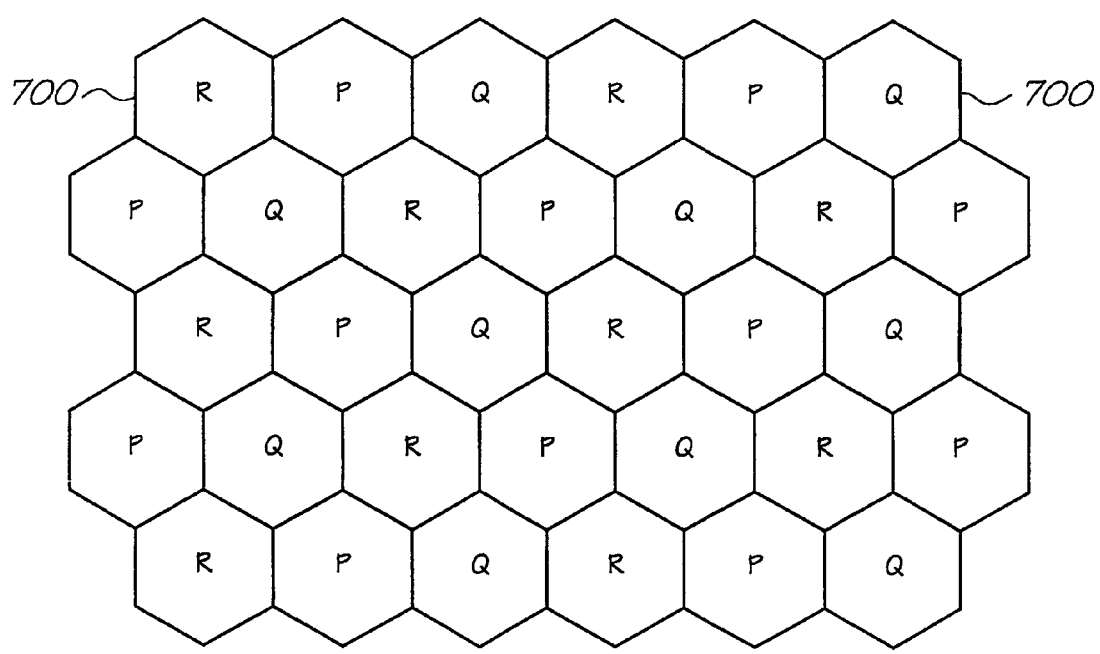
FIG. 10 shows the continuous tiling of tags P, Q and R.

FIG. 10 shows how the P, Q and R tags are repeated in a continuous tiling of tags. The tiling guarantees the any set of three adjacent tags contains one tag of each type, and therefore contains a complete set of distributed codewords. The tag type, used to determine the registration of the distributed codewords with respect to a particular set of adjacent tags, is encoded in one of the local codewords of each tag.

Figure 11:
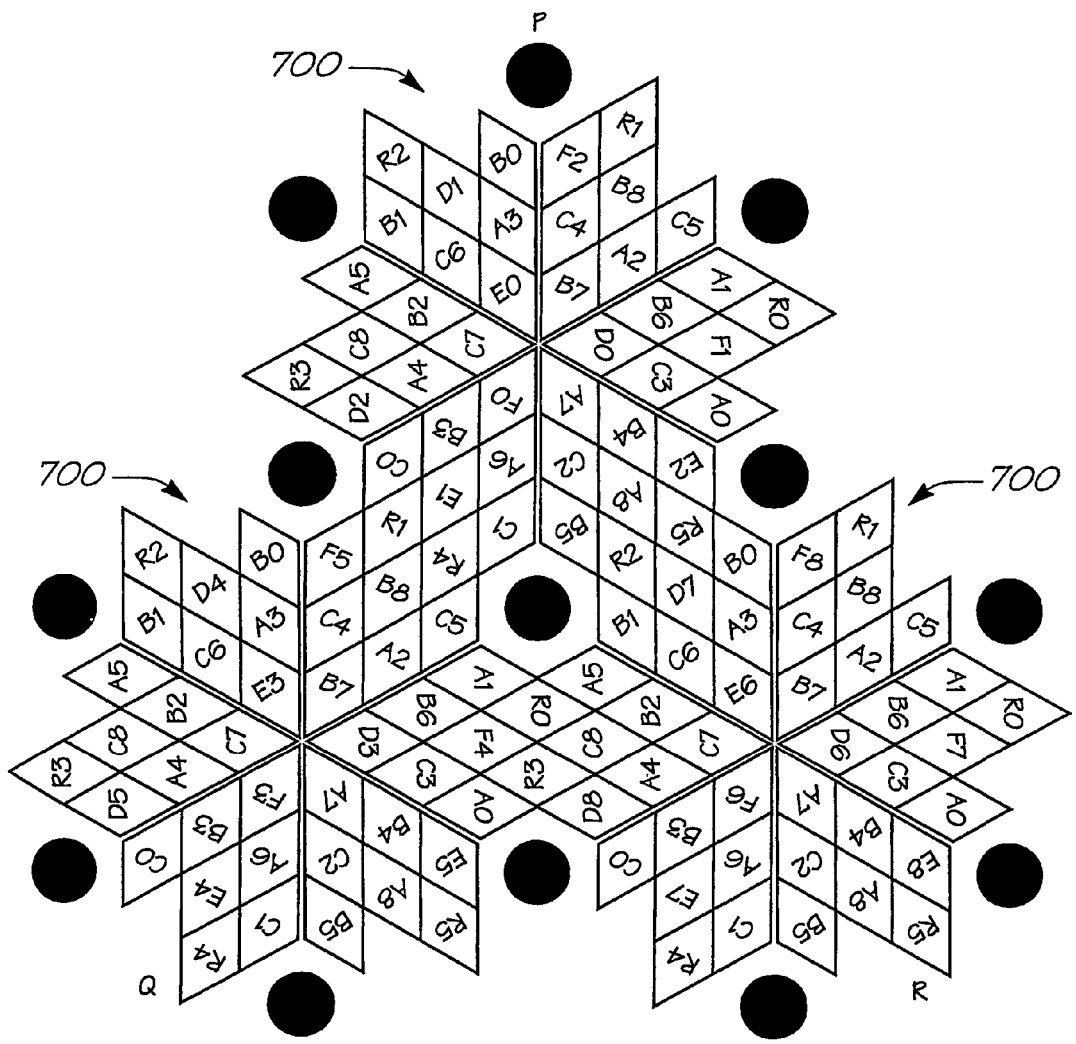
FIG. 11 shows the complete structure of three adjacent tags, including their orientation cyclic position codewords, local codewords and distributed codewords.

FIG. 11 shows the complete structure of three adjacent tags, including their orientation cyclic position codewords, local codewords and distributed codewords.

Figure 12:
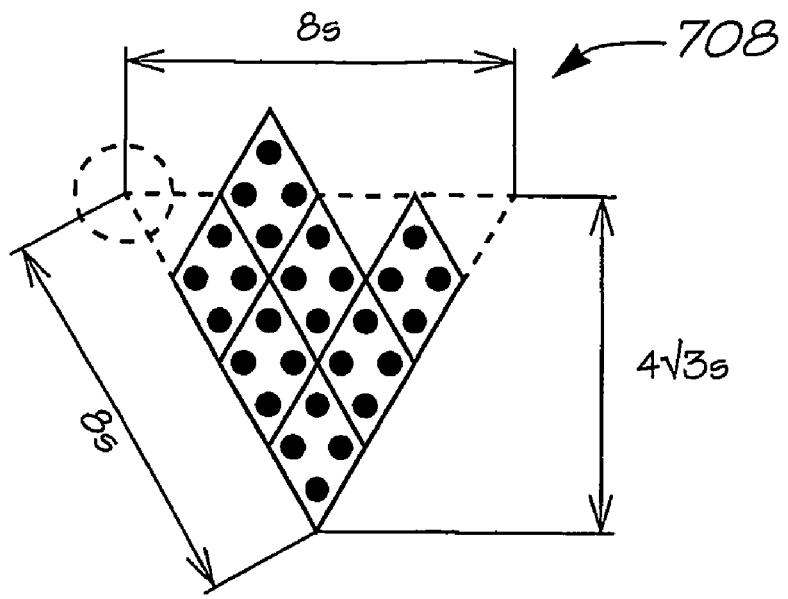
FIG. 12 shows the geometry of a tag segment.

FIG. 12 shows the geometry of a tag segment 708.

Figure 13:
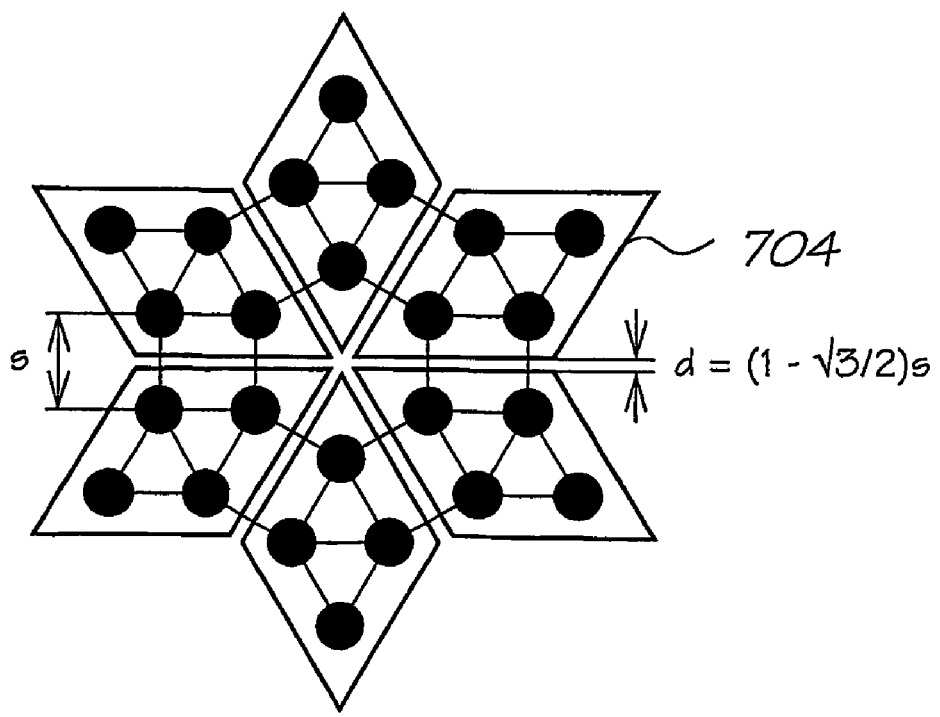
FIG. 13 shows the preferred spacing $d=(1-\sqrt{3}/2)s$ between tag segments, required to maintain consistent spacing between macrodots.

FIG. 13 shows the spacing $d=(1-\sqrt{3}/2)s$ between tag segments, required to maintain consistent spacing between macrodots.

Figure 14:
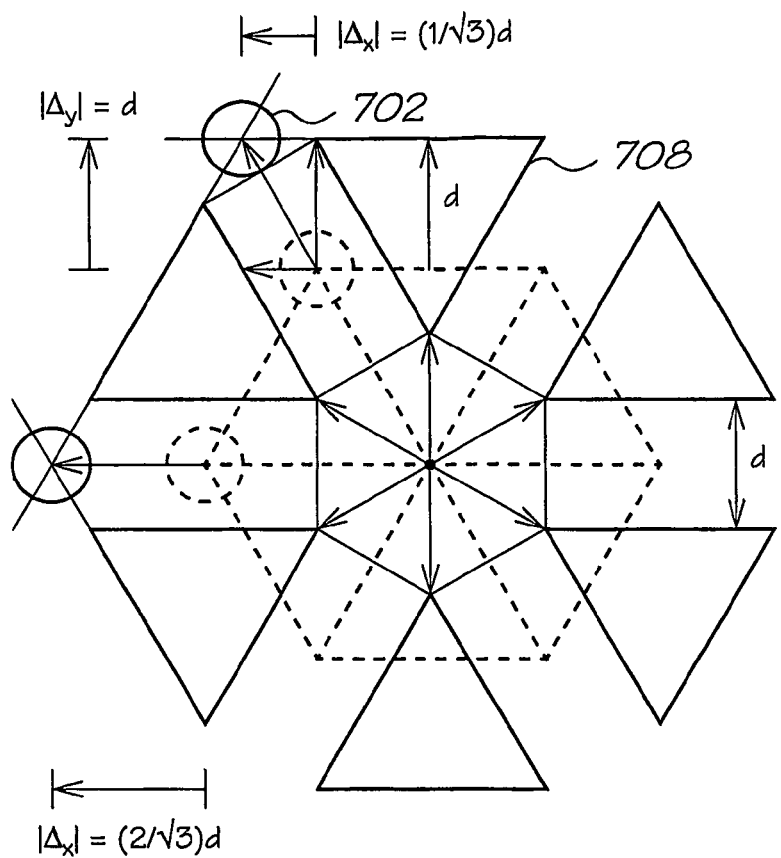
FIG. 14 shows the effect of the inter-segment spacing d on target position.

FIG. 14 shows the effect of the inter-segment spacing d on target position. Compared with their nominal positions in relation to closely-packed segments (i.e. with d=0), diagonal targets must be displaced by $(\Delta_x, \Delta_y)=(\pm 1/\sqrt{3}, \pm 1)d$, and horizontal targets must be displaced by $(\Delta_x, \Delta_y)=(\pm 2/\sqrt{3}, 0)d$.

1.6 Reed-Solomon Encoding

Both local and distributed codewords are encoded using a punctured $2^4$-ary (9, 5) Reed-Solomon code.

A $2^4$-ary (9, 5) Reed-Solomon code encodes 20 data bits (i.e. five 4-bit symbols) and 16 redundancy bits (i.e. four 4-bit symbols) in each codeword. Its error-detecting capacity is four symbols. Its error-correcting capacity is two symbols.

A punctured $2^4$-ary (9, 5) Reed-Solomon code is a $2^4$-ary (15, 5) Reed-Solomon code with six redundancy coordinates removed.

The code has the following primitive polynominal:

$$p(x)=x^4+x+1$$

The code has the following generator polynominal:

$$g(x)=(x+\alpha)(x+\alpha^2) \ldots (x+\alpha^{10})$$

For a detailed description of Reed-Solomon codes, refer to Wicker, S. B. and V. K. Bhargava, eds., *Reed-Solomon Codes and Their Applications*, IEEE Press, 1994.

2. Tag Coordinate Space

Figure 15:
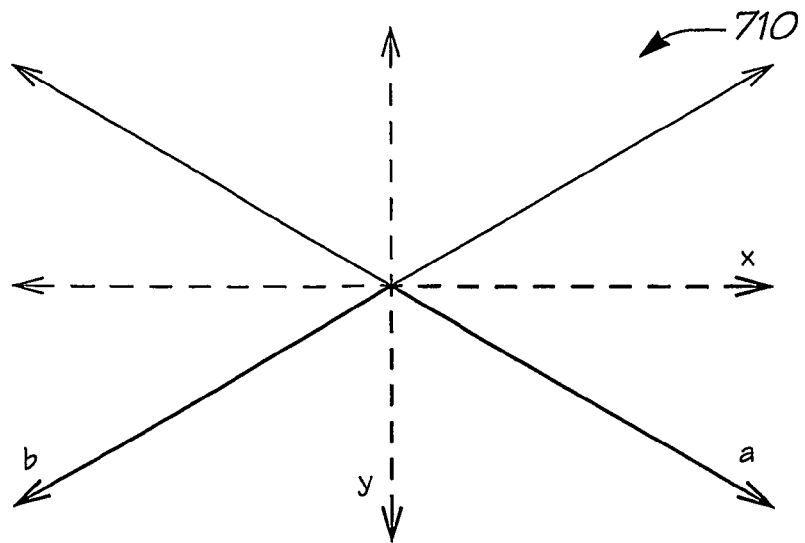
FIG. 15 shows the nominal relationship between the tag coordinate space and the surface x-y coordinate space.

The tag coordinate space 710 is defined by a pair of semi-orthogonal coordinates a and b. The nominal relationship between the tag coordinate space and the surface x-y coordinate space is illustrated in FIG. 15.

The coordinates are necessarily only semi-orthogonal to ensure reproducibility of the tag pattern by intended printing devices (as discussed below under the heading "Encoding and Printing Considerations").

To further assist intended printing devices, the surface coding, and hence the a-b coordinate space, is allowed to be rotated an arbitrary multiple of 90 degrees with respect to the x-y coordinate space.

Given an anti-clockwise rotation R of the a-b coordinate space with respect to the x-y coordinate space, the relations between the two coordinates spaces are:

$$x = a\cos(30° - R) - b\sin(60° - R) \quad \text{(EQ 1)}$$

$$y = a\sin(30° - R) + b\cos(60° - R) \quad \text{(EQ 2)}$$

$$a = \frac{x}{2\cos(30° - R)} + \frac{y}{2\sin(30° - R)} \quad \text{(EQ 3)}$$

$$b = \frac{-x}{2\sin(60° - R)} + \frac{y}{2\cos(60° - R)} \quad \text{(EQ 4)}$$

Figure 16:
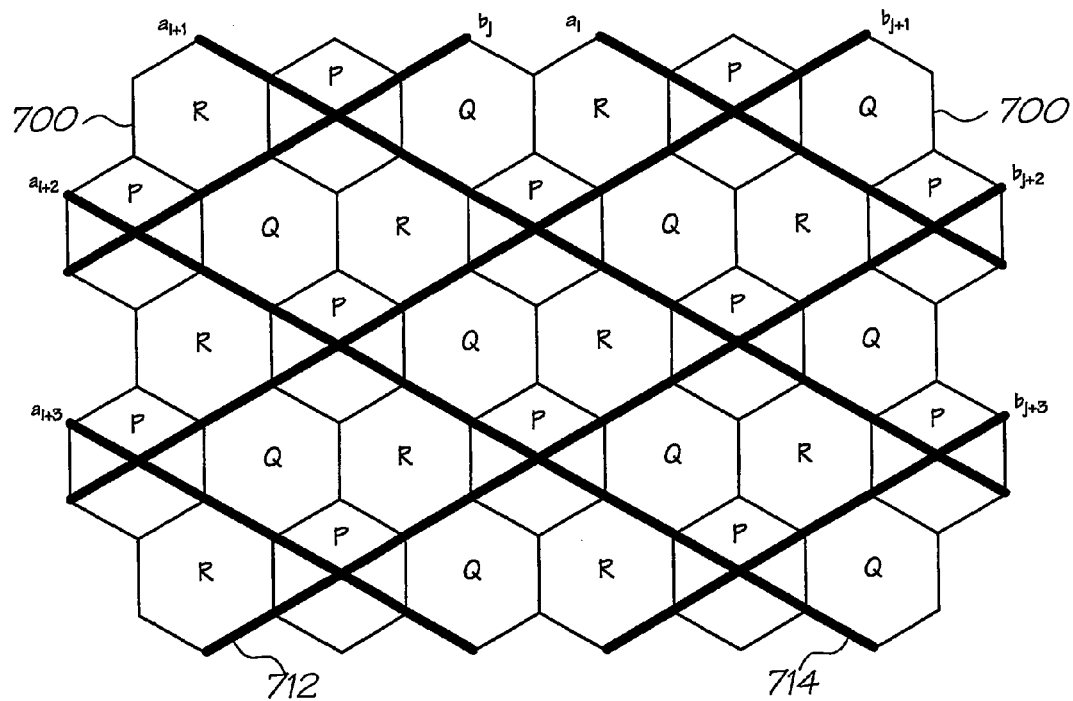
FIG. 16 shows a tag coordinate grid superimposed on the tag tiling.

Integer a and b coordinates are defined to intersect at the centres of P tags, as illustrated in FIG. 16. The figure shows lines 714 and 712 representing iso-lines of integer a and b coordinates respectively.

Note that the surface coding does not specify the location of the x-y (or a-b) origin on a particular tagged surface, or the orientation of the x-y (or a-b) coordinate space with respect to the surface. It only defines the relationship between the two coordinate spaces. This manifests itself in the x-y coordinates embedded in digital ink generated by a netpage sensing device used to interact with a netpage tagged surface.

3. Tag Information Content

Table 4 defines the information fields embedded in the surface coding. Table 5 defines how these fields map to local and distributed codewords.

TABLE 4

Field definitions

| field | width | description |
|---|---|---|
| tag type | 2 | Defines whether the tag is of type P (b'00'), Q (b'01') or R (b'10'). |
| tag format | 2 | The format of the tag information. b'00' indicates the format specified in this table. All other values are reserved. |

TABLE 4-continued

Field definitions

| field | width | description |
|---|---|---|
| local flag | 1 | Indicates whether the region ID is owned by a local netpage system (b'1') or the global netpage system (b'0'). |
| active area map | 7 | A map[a] of which of the tag and its immediate neighbours are members of an active area; b'1' indicates membership. |
| input area map | 7 | A map[a] of which of the tag and its immediate neighbours are members of an input area; b'1' indicates membership. |
| coordinate precision (w) | 5 | The precision of the a and b coordinates; valid range is 0 to 20. |
| a coordinate | w (0 to 20) | The signed a coordinate of the tag, in sign-magnitude format. |
| b coordinate | w (0 to 20) | The signed b coordinate of the tag, in sign-magnitude format |
| region ID | 96-2w (96 to 56) | The ID of the region containing the tags. |
| total | 120 | |

Figure 17:
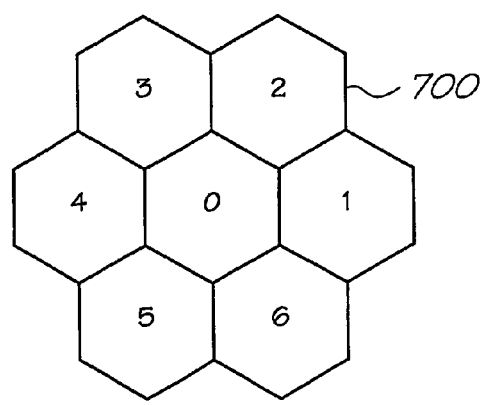
FIG. 17 shows a tag and its six immediate neighbours, each labelled with its corresponding bit index in the active area map and the input area map.

[a]FIG. 17 indicates the bit ordering of the map.

FIG. 17 shows a tag and its six immediate neighbours, each labelled with its corresponding bit index in the active area map and the input area map.

Since the top 55 bits of the region ID are encoded in distributed codewords, they are by necessity constant for an entire contiguous tiling of tags. The bottom 41 bits, however, are encoded in local codewords, and so may vary arbitrarily from one tag to the next.

For a particular surface coding, the number of bits dedicated to the a and b coordinates is configurable via the coordinate precision field. In this way the precision can be tuned to the size of the surface being tagged, which in turn allows efficient use of a higher-precision region ID space. Region IDs can be allocated from the full-precision 95-bit space, but with the constraint that for a particular coordinate precision of w, the bottom 2w bits of each allocated region ID must be zero. Almost equivalently, different-precision region IDs can be allocated from precision-specific pools, and each allocated region ID can be indexed and looked-up in a pool-specific way.

TABLE 5

Mapping of fields to codewords

| field | codeword | width | codeword bits | field bits |
|---|---|---|---|---|
| tag type | A | 2 | 1:0 | all |
| tag format | | 2 | 3:2 | all |
| local flag | | 1 | 4 | all |
| active area map | | 7 | 11:5 | all |
| input area map | | 7 | 18:12 | all |
| coordinate precision (w) | D | 5 | 19:15 | all |
| a coordinate | B | w | (w − 1):0 | all |
| b coordinate | C | w | (w − 1):0 | all |
| region ID | D | 15 | 14:0 | 95:81 |
| | E | 20 | 19:0 | 80:61 |
| | F | 20 | 19:0 | 60:41 |
| | A | 1 | 19 | 40 |
| | B | 20 − w | 19:w[a] | 39:(20 + w)[a] |
| | C | 20 − w | 19:w[a] | (19 + w):2w[a] |

[a]if w < 20

The active area map indicates whether the corresponding tags are members of an active area. An active area is an area within which any captured input should be immediately forwarded to the corresponding netpage server for interpretation. It also allows the netpage sensing device to signal to the user that the input will have an immediate effect.

The input area map indicates whether the corresponding tags are members of an input area, i.e. lie within the extent of a form. It allows the netpage sensing device to signal to the user that the input will be submitted to an application.

4. Encoding and Printing Considerations

The Print Engine Controller (PEC) (as disclosed in the present Applicants' co-pending PCT application publication numbers WO 01/89851—Print Engine/Controller and Printhead Interface Chip Incoroporating the Print Engine/Controller and WO 01/89838—Printed Page Tag Encoder, the contents of both of which are herein incorporated by reference) supports the encoding of two fixed (per-page) $2^4$-ary (15, 5) Reed-Solomon codewords and six variable (per-tag) $2^4$-ary (15, 5) Reed-Solomon codewords. Furthermore, PEC supports the rendering of tags via a rectangular unit cell whose layout is constant (per page) but whose variable codeword data may vary from one unit cell to the next. PEC does not allow unit cells to overlap in the direction of page movement.

Figure 18:
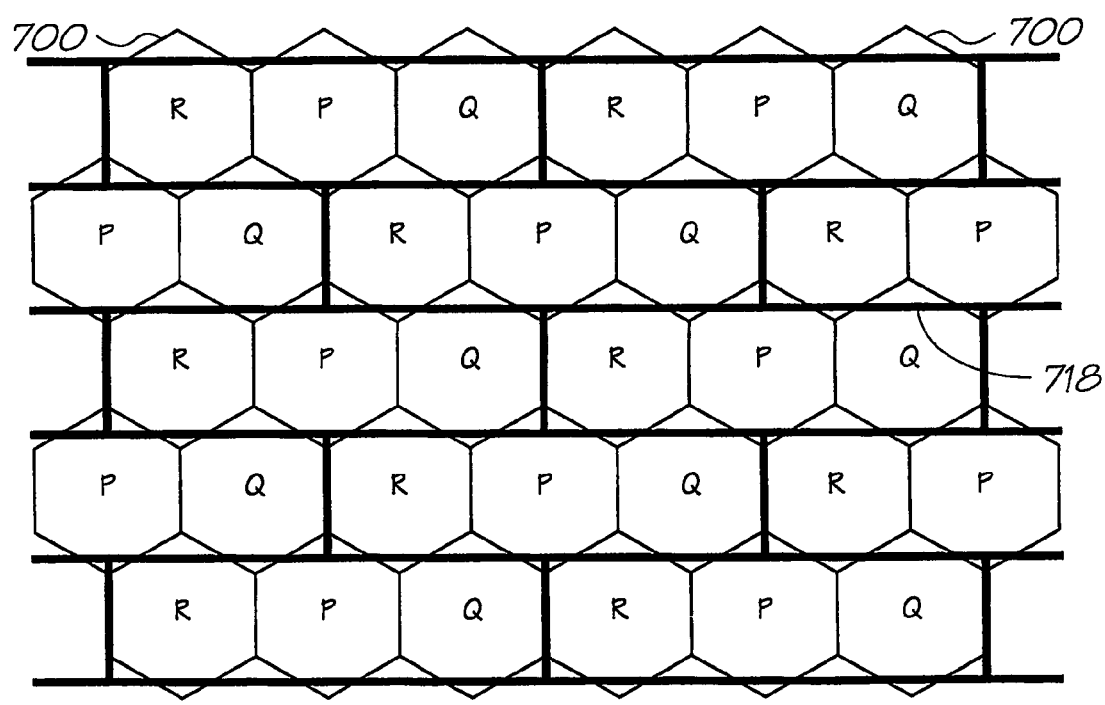
FIG. 18 shows a preferred embodiment of a PEC unit cell compatible with the present surface coding, superimposed on a tiling of tags.
Figure 19:
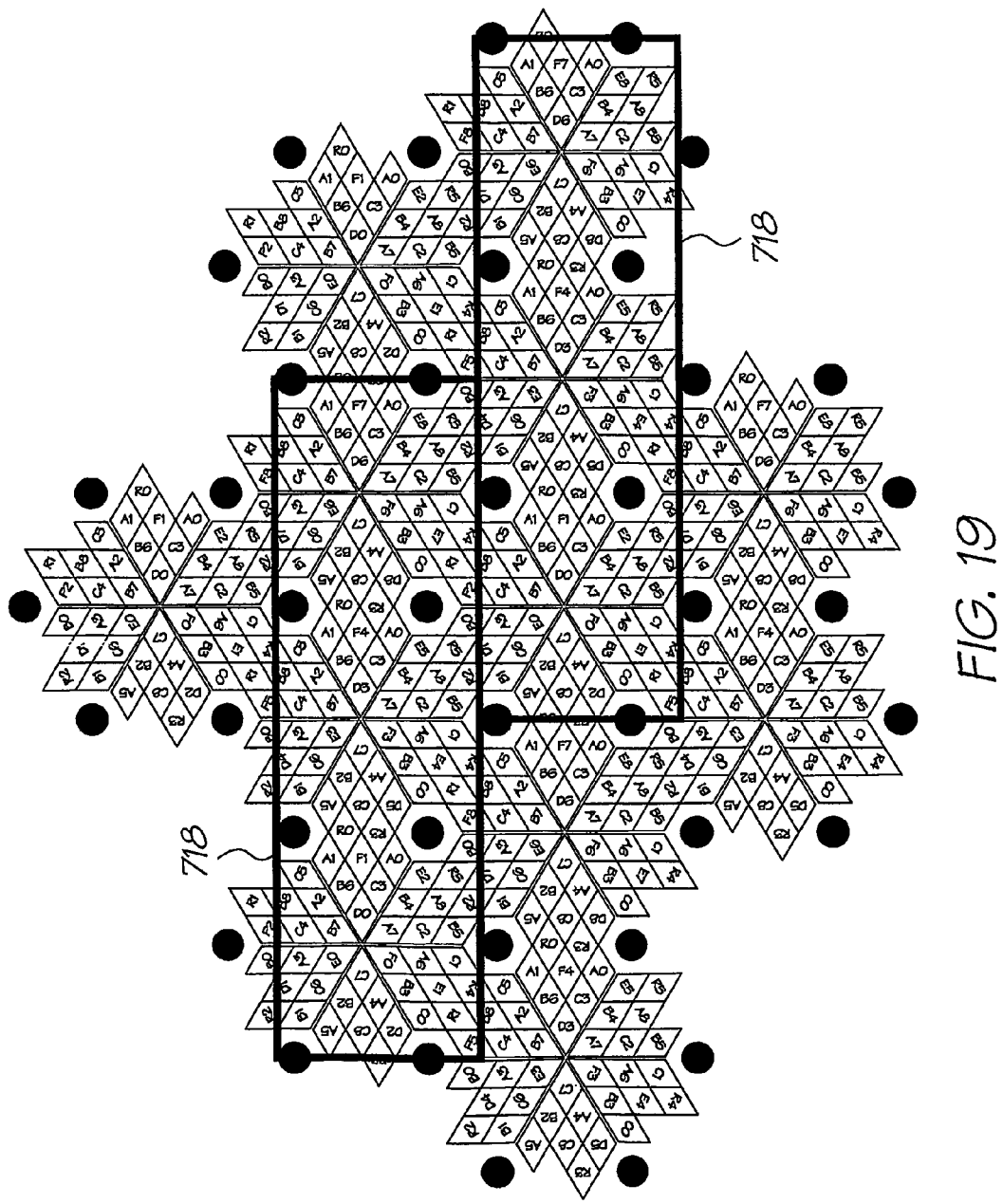
FIG. 19 shows a preferred embodiment of a PEC unit cell superimposed on actual P, Q and R type tag structures.

FIG. 18 shows a preferred embodiment of a PEC unit cell 718 compatible with the present surface coding, superimposed on a tiling of tags. FIG. 19 shows the proposed PEC unit cell superimposed on actual P, Q and R type tag structures. Note that the proposed unit cell is centered horizontally on a P type tag. The tag structure and unit cell are designed so that the unit cell contains exactly six variable codewords (i.e., for row n, $R_n$:A, $P_n$:A, $Q_n$:A, $\{R, P, Q\}_n$:B, $\{R, P, Q\}_n$:C, and $\{R, P, Q\}_{n+1}$:B), and three fixed codewords D, E and F.

At least one of codewords D, E and F must be pre-encoded in the Tag Format Structure (TFS) passed to PEC, since PEC only supports the encoding of two fixed codewords. Any or all of codewords D, E and F could be pre-encoded in the TFS.

PEC imposes a limit of 32 unique bit addresses per TFS row. The contents of the unit cell respect this limit, assuming pre-encoding of D, E and F codewords.

PEC also imposes a limit of 384 on the width of the TFS. The contents of the unit cell respect this limit.

Note that for a reasonable page size, the number of variable coordinate bits in the B and C codewords is modest, making encoding via a lookup table tractable. Encoding of the A codeword via a lookup table may also be possible. Note that since a Reed-Solomon code is systematic, only the redundancy data needs to appear in the lookup table.

5. Imaging and Decoding Considerations

Figure 20:
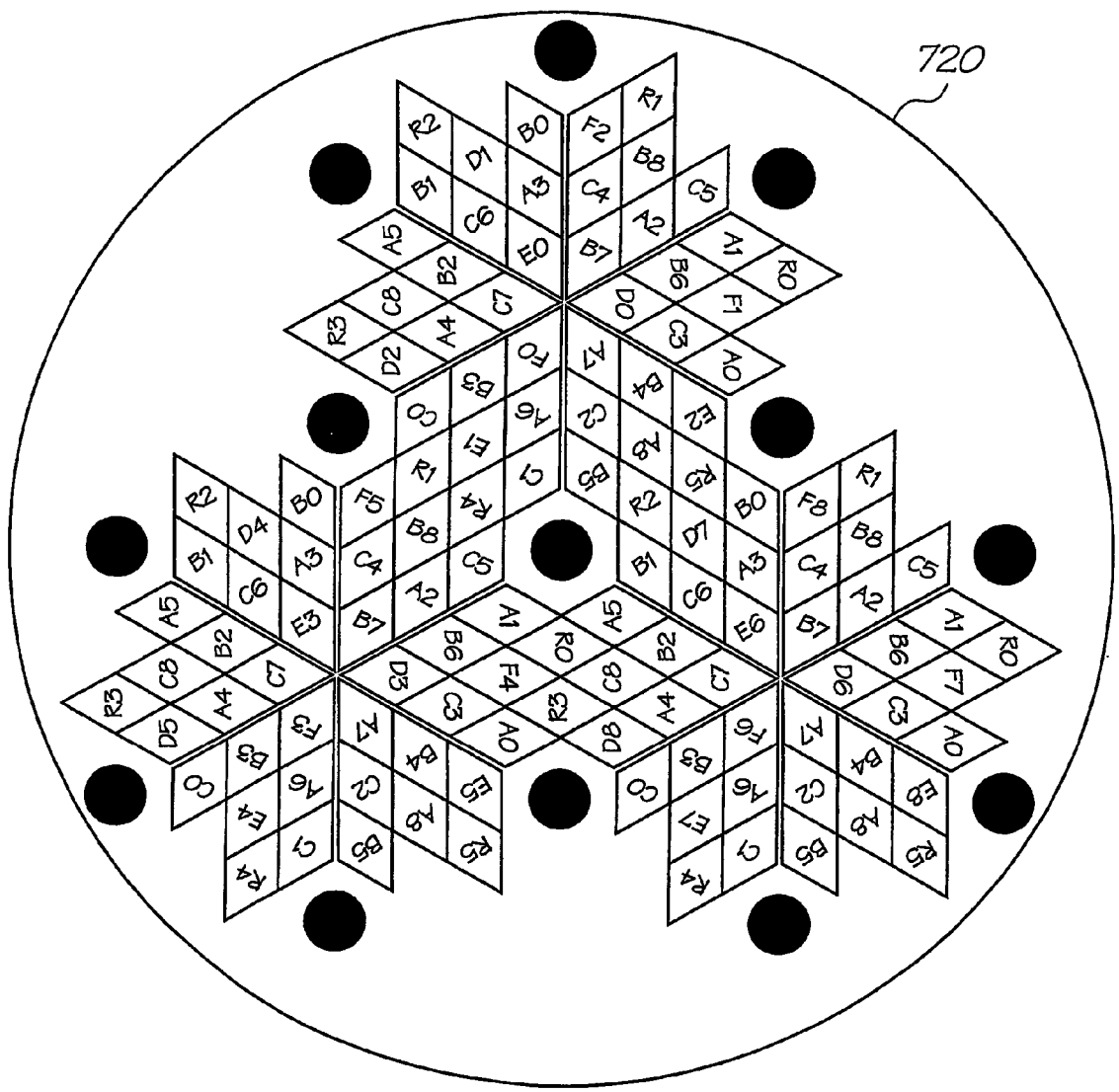
FIG. 20 shows a preferred minimal imaging field of view required to guarantee acquisition of an entire tag.

FIG. 20 shows a preferred minimal imaging field of view 720 required to guarantee acquisition of an entire tag, i.e. given arbitrary alignment between the surface coding and the field of view.

The diameter of the minimal field of view is 36s.

Figure 21:
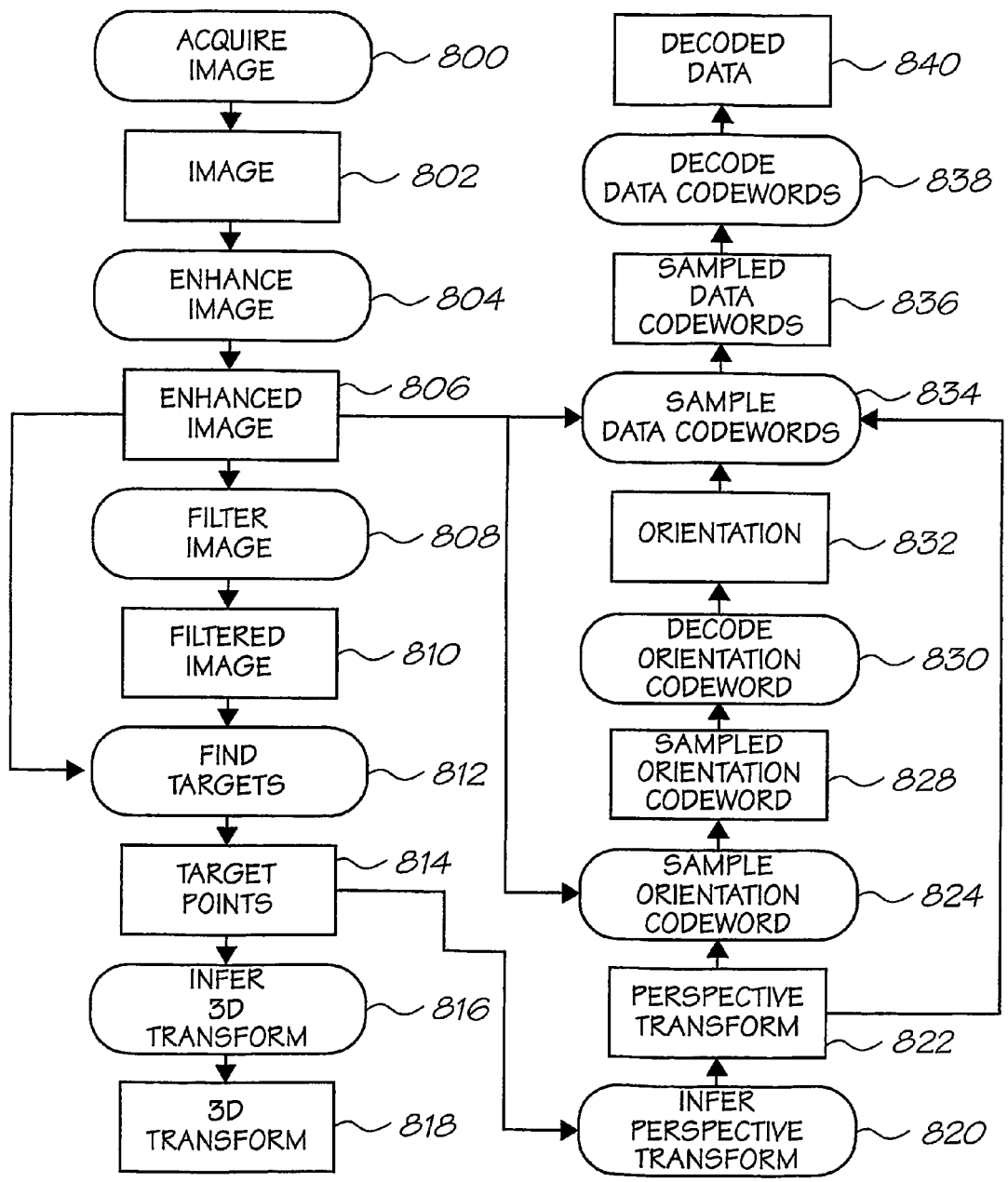
FIG. 21 shows a tag image processing and decoding process flow.

Given the present tag structure, the corresponding decoding sequence is as follows:
  locate targets of complete tag
  infer perspective transform from targets
  sample cyclic position code
  decode cyclic position code
  determine orientation from cyclic position code
  sample local Reed-Solomon codewords
  decode local Reed-Solomon codewords
  determine tag type
  determine tag rotation sample distributed Reed-Solomon codewords (modulo window alignment, with reference to tag type)
decode distributed Reed-Solomon codewords
determine coordinate precision
determine region ID
determine tag a-b location
transform tag a-b location to x-y location, with reference to tag rotation
infer 3D transform from oriented targets
determine nib x-y location from tag x-y location and 3D transform
determine active/input area status of nib location
generate local feedback based on nib active/input area status
encode region ID, nib x-y location, nib active/input area status in digital ink FIG. 21 shows a tag image processing and decoding process flow. A raw image 802 of the tag pattern is acquired (at 800), for example via an image sensor such as a CCD image sensor, CMOS image sensor, or a scanning laser and photodiode image sensor. The raw image is then typically enhanced (at 804) to produce an enhanced image 806 with improved contrast and more uniform pixel intensities. Image enhancement may include global or local range expansion; equalisation, and the like. The enhanced image 806 is then typically filtered (at 808) to produce a filtered image 810. Image filtering may consist of low-pass filtering, with the low-pass filter kernel size tuned to obscure macrodots but to preserve targets. The filtering step 808 may include additional filtering (such as edge detection) to enhance target features. The filtered image 810 is then processed to locate target features (at 812), yielding a set of target points. This may consist of a search for target features whose spatial inter-relationship is consistent with the known geometry of a tag. Candidate targets may be identified directly from maxima in the filtered image 810, or may the subject of further characterisation and matching, such as via their (binary or grayscale) shape moments (typically computed from pixels in the enhanced image 806 based on local maxima in the filtered image 810), as described in U.S. patent application Ser. No. 09/575,154. The search typically starts from the center of the field of view. The target points 814 found by the search step 812 indirectly identify the location of the tag in the three-dimensional space occupied by the image sensor and its associated optics. Since the target points 814 are derived from the (binary or grayscale) centroids of the targets, they are typically defined to sub-pixel precision.

It may be useful to determine the actual 3D transform of the tag (at 816), and, by extension, the 3D transform (or pose) 818 of the sensing device relative to the tag. This may be done analytically, as described in U.S. patent application Ser. No. 09/575,154, or using a maximum likelihood estimator (such as least squares adjustment) to fit parameter values to the 3D transform given the observed perspective-distorted target points (as described in P. R. Wolf and B. A. Dewitt, *Elements of Photogrammetry with Applications in GIS*, 3rd Edition, McGraw Hill, February 2000, the contents of which are herein incorporated by reference thereto). The 3D transform includes the 3D translation of the tag, the 3D orientation (rotation) of the tag, and the focal length and viewport scale of the sensing device, thus giving eight parameters to be fitted, or six parameters if the focal length and viewport scale are known (e.g. by design or from a calibration step). Each target point yields a pair of observation equations, relating an observed coordinate to a known coordinate. If eight parameters are being fitted, then five or more target points are needed to provide sufficient redundancy to allow maximum likelihood estimation. If six parameters are being fitted, then four or more target points are needed. If the tag design contains more targets than are minimally required to allow maximum likelihood estimation, then the tag can be recognised and decoded even if up to that many of its targets are damaged beyond recognition.

To allow macrodot values to be sampled accurately, the perspective transform of the tag must be inferred. Four of the target points are taken to be the perspective-distorted corners of a rectangle of known size in tag space, and the eight-degree-of-freedom perspective transform 822 is inferred (at 820), based on solving the well-understood equations relating the four tag-space and image-space point pairs (see Heckbert, P., *Fundamentals of Texture Mapping and Image Warping*, Masters Thesis, Dept. of EECS, U. of California at Berkeley, Technical Report No. UCB/CSD 89/516, June 1989, the contents of which are herein incorporated by reference thereto). The perspective transform may alternatively be derived from the 3D transform 818, if available.

The inferred tag-space to image-space perspective transform 822 is used to project (at 824) the known position of each data bit of the orientation-indicating cyclic position codeword from tag space into image space where the real-valued position is used to bi-linearly (or higher-order) interpolate (at 824) the four (or more) relevant adjacent pixels in the enhanced input image 806. The resultant macrodot value is compared with a suitable threshold to determine whether it represents a zero bit or a one bit. For sampling purposes, the spatial layout of the orientation-indicating cyclic position codeword is fixed, and is orientation-invariant.

Once the bits of the complete orientation-indicating cyclic position codeword have been sampled, the orientation-indicating codeword is decoded (at 830), as previously described, to obtain the orientation 832 of the tag relative to the sampling orientation.

The inferred tag-space to image-space perspective transform 822 is used to project (at 834) the known position of each data bit of the local and distributed codewords from tag space into image space where the real-valued position is used to bi-linearly (or higher-order) interpolate (at 834) the four (or more) relevant adjacent pixels in the enhanced input image 806. The resultant macrodot value is compared with a suitable threshold to determine whether it represents a zero bit or a one bit. For sampling purposes, the spatial layout of the local and distributed codewords is fixed, but is orientation-specific. The orientation 832 is therefore used to determine the actual orientation of the layout.

Once the bits of one or more complete codewords have been sampled, the codewords are decoded (at 838) to obtain the desired data 840 encoded in the tag. Redundancy in the codeword may be used to detect errors in the sampled data, or to correct errors in the sampled data.

As discussed in U.S. patent application Ser. No. 09/575,154, the obtained tag data 840 may directly or indirectly identify the surface region containing the tag and the position of the tag within the region. An accurate position of the sensing device relative to the surface region can therefore be derived from the tag data 840 and the 3D transform 818 of the sensing device relative to the tag.

CONCLUSION

Although the invention has been described with reference to a number of specific examples, it will be appreciated by those skilled in the art that the invention can be embodied in many other forms.

The invention claimed is:

1. Machine-readable coded data disposed on or in a substrate in accordance with a layout, the layout having at least order n rotational symmetry, where n is at least two, the layout encoding an orientation codeword comprising a sequence of an integer multiple m of n symbols, where m is one or more, each encoded symbol being distributed at n locations about a center of rotational symmetry of the layout such that decoding the symbols at each of the n orientations of the layout produces n representations of the orientation codeword, each representation comprising a different cyclic shift of the orientation codeword and being indicative of the degree of rotation of the layout, and wherein the orientation codeword is fault tolerant.

2. Machine-readable coded data according to claim 1 wherein the orientation codeword is sufficiently fault tolerant such that each representation of the orientation codeword can be accurately decoded even if one of its symbols is corrupted.

3. Machine-readable coded data according to claim 1 wherein the orientation codeword is sufficiently fault tolerant such that each representation of the orientation codeword can be accurately decoded even if two or more of its symbols are corrupted.

4. Machine-readable coded data according to claim 1, wherein the layout is repeated on the substrate within a layout region.

5. Machine-readable coded data according to claim 4 wherein the layout region comprises a plurality of layouts of two or more layout types, each layout encoding its layout type.

6. Machine-readable coded data according to claim 5 encoding a distributed codeword wherein fragments of the distributed codeword are distributed between the two or more layout types in a predetermined manner such that the distributed codeword can be reconstructed from fragments located in a plurality of adjacent layouts of different types.

7. Machine-readable coded data according to claim 4, wherein the layouts are packed together on the substrate.

8. Machine-readable coded data according to claim 5 wherein the number of layout types is one of 2, 3, 4 and 6.

9. Machine-readable coded data according to claim 1 wherein the layout encodes a local codeword wherein fragments of the local codeword are distributed within the layout in a predetermined manner such that the local codeword can be reconstructed from the fragments.

10. Machine-readable coded data according to claim 1, wherein the layout is any of the following in shape:
    linear;
    square;
    rectangular;
    triangular; or
    hexagonal.

11. Machine-readable coded data according to claim 1, wherein n is one of 2, 3, 4 and 6.

12. Machine-readable coded data according to claim 1, including one or more target features for enabling preliminary location and rotation of the layout to be determined by a machine used to read the coded data.

13. Machine-readable coded data according to claim 12, wherein the target features are configured to enable perspective correction of the coded data of the, or each, layout upon reading by the machine.

14. Machine-readable coded data according to claim 13, including at least four of the target features.

15. Machine-readable coded data according to any one of claims 12 to 14, including a plurality of the layouts, wherein at least some of the target features are shared by at least two of the layouts.

16. Machine-readable coded data according to claim 1, the coded data being printed onto the substrate.

17. Machine-readable coded data according to claim 16, wherein the coded data is printed onto the surface in ink that is of low-visibility or is invisible to an average unaided human eye.

18. Machine-readable coded data according to claim 17, wherein the ink is an infrared ink that is substantially invisible to an average unaided human eye.

19. Machine-readable coded data according to claim 1, wherein the coded data of each layout defines user data.

20. Machine-readable coded data according to claim 19, wherein the user data includes location data indicative of a position of the layout pattern relative to a region of the surface.

21. Machine-readable coded data according to claim 19, wherein the user data includes identification data identifying a region of the surface within which the layout is disposed.

22. Machine-readable coded data according to any one of claims 19 to 21, wherein the user data includes function data identifying a function to be performed upon reading of the layout pattern or sub-pattern by the machine.

23. A method of generating an interface surface, including the steps of:
    receiving, in a printer, user data;
    generating machine-readable coded data incorporating the user data, in accordance with claim 19; and
    printing the coded data onto a substrate.

24. A method according to claim 23, further including the step of printing visible markings on the substrate.

25. A method according to claim 24, wherein the coded data and visible markings are printed onto the substrate substantially simultaneously.

26. A surface bearing machine-readable coded data in accordance with claim 1.

27. A surface according to claim 26, the surface being flat or curved.

28. A surface according to claim 26, further including visible markings.

29. A surface according to claim 28, wherein the visible markings include any one or more of the following:
    text;
    graphics;
    images;
    forms;
    fields; and
    buttons.

30. A surface according to claim 28, wherein the visible marking are disposed adjacent to, or coincident with, at least some of the coded data.

31. A surface according to claim 26, the surface being defined by a substrate.

32. A surface according to claim 31, wherein the substrate is paper, card or another laminar medium.

33. A surface according to claim 26, configured for use as an interface surface for enabling user interaction with a computer.

34. A method of using a sensing device to read machine-readable coded data according to claim 1, the method including the steps of:
   (a) reading, using the sensing device, the coded data of the layout;
   (b) decoding the coded data of the layout, thereby determining at least the representation of the orientation codeword; and
   (c) using the representation of the orientation codeword to determine a degree of rotation of the layout.

35. A method according to claim 34, wherein step (a) includes the substeps of:
   imaging the substrate to generate an image thereof;
   processing the image to locate one or more target features of the coded data; and
   on the basis of the located target features, determining a position of at least one of the encoded symbols of the orientation codeword.

* * * * *